United States Patent
Barrera et al.

(10) Patent No.: US 6,907,425 B1
(45) Date of Patent: Jun. 14, 2005

(54) SYSTEM AND METHOD FOR SEARCHING INFORMATION STORED ON A NETWORK

(75) Inventors: Joseph R. Barrera, Warren, NJ (US); William Andrew Boyajian, Somerset, NJ (US); Leonard Mark Canale, Tinton Falls, NJ (US); Don Fichter, Phillipsburg, NJ (US); William R. Kamm, Monmouth Junction, NJ (US)

(73) Assignee: AT&T Corp., New York, NY (US)

(*) Notice: Subject to any disclaimer, the term of this patent is extended or adjusted under 35 U.S.C. 154(b) by 104 days.

(21) Appl. No.: 10/372,612

(22) Filed: Feb. 24, 2003

Related U.S. Application Data

(63) Continuation of application No. 09/164,298, filed on Oct. 1, 1998, now Pat. No. 6,567,800.

(51) Int. Cl.[7] ............................................. G06F 17/30
(52) U.S. Cl. .................... 707/3; 707/4; 707/5
(58) Field of Search ................... 707/3–5; 715/513, 715/500.1, 526; 704/201, 217

(56) References Cited

U.S. PATENT DOCUMENTS

| | | |
|---|---|---|
| 5,875,446 A | 2/1999 | Brown et al. |
| 5,930,474 A | 7/1999 | Dunworth et al. |
| 6,038,560 A | 3/2000 | Wical |
| 6,070,158 A | 5/2000 | Kirsch et al. |
| 6,078,866 A | 6/2000 | Buck et al. |
| 6,112,203 A | 8/2000 | Bharat et al. |
| 6,308,202 B1 * | 10/2001 | Cohn et al. ................ 709/217 |

* cited by examiner

Primary Examiner—Alford W. Kindred
(74) Attorney, Agent, or Firm—Michael Haynes PLC

(57) ABSTRACT

A system and method for searching websites that uses category information to narrow the range of a website content search. Website content is retrieved through a network and stored. A user starts a search by selecting a category or categories in which information pertinent to the user's needs is likely to be found. The user then performs a keyword search on the content of websites that fall within the selected category or categories. The results of this category-content search are sent and displayed to the user.

20 Claims, 10 Drawing Sheets

FIG. 2 PRIOR ART

YAHOO! Personalize  Help - Check Email

Home: Arts: Humanities:
Literature

Find and buy any book now. Amazon.com

News & Events Headlines, Live Net Events
Community Chat, Message Boards
Shopping Shopping Guide BUY IT HERE!
Related Books
amazon.com

| Telephone (202) | Search (204) | just this category (203) ▼ |

- Authors (35)
- Awards (28)
- Banned Books (15)
- Bestseller Lists (12)
- Book Arts (59)
- Classics @
- Companies @
- Countries, Cultures, and Groups (116) NEW!
- Creative Writing (182) NEW!
- Criticism and Theory (40)
- Education (56) NEW!
- Electronic Literature (76)
- Events (54) NEW!
- Exhibits (3)
- Genres (5266) NEW!
- History of Books and Printing (101)
- Institutes (135)
- Journals (38)

- Libraries @
- Magazines (453) NEW!
- Mailing Lists (12)
- Museums (15)
- Online Forums (31)
- Organizations (99)
- Periods and Movements (226)
- Poetry (1909) NEW!
- Publishing @
- Reference (79)
- Reviews (127)
- Scripts (7)
- Storytelling @
- Television Shows @
- Trivia (7)
- Indices (40)
- Usenet (20)

— 201

- Book Report, The - book review, excerpts, a gift guide, editorials, and interviews with authors.
- BookBrowser - collection of fiction reading lists. Find the next book in a series, new works by your favorite author or new titles in your favorite genre.
- Booknotes - America's finest authors on reading, writing, and the power of ideas. Includes transcripts and and RealVideo clips from the C-SPAN show.
- Bookplex - excerpts of best-sellers and interviews with popular authors, such as Anne Rice, Clive Barker and Dominick Dunne.
- Booktalk - all the buzz about books.
- BookWeb - author tours, bookstore directories, discussion groups, etc.
- BookWire >REVIEW< - bestseller lists, reviews and more
- Chapter One - featuring full first chapters of books with reviews and discussions, from the Washington Post.
- Digital Book World - index of new and old books, by author, title or publisher, as well as links to

FIG. 4 PRIOR ART

[ Search ]

Click Here!

/ Finance / Travel / Get Wild / Health /
/ Business Search / People Search / Browse by Subject /

Search [ the Web ▼ ] for documents in [ any language ▼ ]

[ AT&T ]

401

[ search ] [ refine ]

Help · Preferences · New Search · Advanced Search 308773 documents match your query. ──────── 404
Search Amazon.com for top-selling titles about AT&T.

Real Name<sup>SM</sup> Address - AT&T                                    402
    Subscribe your company, brands and trademarks to the Real Name System.

1. AT&T Capital Leasing Service - hard drive
    I am a VAR, Reseller or Manufacturer currently using AT&T Capital Leasing ──403
    Services to provide financing to my clients. I am a VAR, Reseller or...
    http://www.ceolink.com/ - size 5K - 14-Aug-97 - English - Translate 2. Wanted:used AT&T smartphones
    Wanted:used AT&T smartphones. Posted by Kent Williams (kentw@mail.startext.net)
    on Tue - Apr 30 08:00:38 EDT 1996. Looking for used AT&T smartphones......
    http://www.payphones-usa.com/freebies/messages/830865638.html -
    size 364 bytes - 30-Apr-96-English - Translate 3. AT&T Virtual Classroom Contest '97
    AT&T Virtual Classroom Contest '97. English. Japanese. What's New The latest news
    about the VC97 Program. Press releases are also archived here. About.
    http://www.vc97.attjens.co.jp/ - size 11K - 5-Mar-98 - English - Translate 4. SDRAM AT&T memory 1-(888) 910-0900
    memory upgrades, SDRAM AT&T memory, ram shipped to your door overnight. all
    major credit cards accepted (888) 910-0900 (toll free)
    http://www.magicmac.com/memory/0/mem155.htm - size 2K - 24-Jul-97
    -English - Translate 5. "AT+T Global Information Solution A/S", Denmark
    X.500 White Pages Directory. Move upwards to. The World. Denmark. Subtree search in
    AT+T Global Information Solutions A/S: AT+T Global Information...
    http://ds2.internic.net:8888/o%3d%22AT+T%20Global%20Information%20Solutions%20A%2fS%
    - size 3K - 24-Aug-94 - English - Translate 6. The Ultimate Directory - AT&T WorldNet Service
    Yellow Pages White Pages Classifieds Investing Community City Guide Government

SYSTEM AND METHOD FOR SEARCHING INFORMATION STORED ON A NETWORK

CROSS-REFERENCE TO RELATED APPLICATIONS

This application is a continuation of application Ser. No. 09/164,298 filed Oct. 1, 1998 now U.S. Pat. No. 6,567,800 and titled "System and Method for Searching Information Stored on a Network."

BACKGROUND OF THE INVENTION

The field of the invention is searching, and in particular searching for information stored in a set of websites.

A website ("site") is defined herein as a collection of files stored on a computer (e.g., a server) that is connected to a network. The World Wide Web (WWW) is a collection of websites whose servers are interconnected through the Internet. A collection of websites can also be stored on servers that are interconnected through a private network, e.g., through an intranet.

In many cases, at least some of the files of a website contain hyperlinks. A hyperlink is typically a text, graphic or image object in a first file that, when selected by a user, either causes a second file to be displayed to the user, causes a different part of the first file to be displayed to the user, or executes a program. In this way, a file in a website can be interrelated with another file stored at the same website, a different website, or elsewhere. The interrelated files of a single website usually reflect a common theme, such as information about a particular company, activity, or service.

The amount of information stored in a collection of websites can be substantial. For example, the WWW includes over 600,000 websites. Conservatively assuming an average data size of 2 Megabytes (MB) per website, the WWW includes over 1200 billion bytes of information across a wide range of topics. Finding a particular piece of information in such a large collection can be problematic. For example, simple browsing through the websites in search of a particular type of information can be impractical in a website collection of substantial size.

One known system addresses the problem of finding particular information stored at websites by categorizing websites according to the topic or topics to which they pertain. One such known system is the Yahoo! search engine located at <http:\\www.yahoo.com>. Yahoo! obtains information about the topic or theme to which a website pertains along with a brief narrative describing the contents of the website (i.e., from the administrator or owner of the website). This information (along with a website identifier) is then correlated with a category. The Yahoo! categories are organized hierarchically, so that a given category typically has one or more subcategories, and each such subcategory has further subcategories, etc.

An example of a Yahoo! interface is shown in FIG. 1. An example of a category is Arts&Humanities, 101, which has subcategories Literature 102 and Photography 103. When a user selects the Literature subcategory 102, Yahoo! displays the page shown in FIG. 2 to the user. FIG. 2 shows numerous subcategories 201 of the Literature subcategory 102. Hereinafter, the term "category" will be used interchangeably with the term "subcategory."

Yahoo! also accommodates keyword searching. In FIG. 2, a user has entered a search for the keyword "telephone" 202 that is restricted 203 to websites in the Literature category. In this case, the user may be interested in finding literature where the telephone plays a major role. When the search button 204 is selected, only website descriptions, and not website content, that fall under the category "Literature" are searched for the term "telephone." Website descriptions are generally terse, one line or one paragraph summaries describing the content of the website. A website description cannot fully capture all of the detail contained in the website's content. Indeed, by definition, it is a summary. Because only the descriptions are keyword searched, and not the content, a Yahoo! keyword search can disadvantageously miss relevant content even when the keyword search is limited to website descriptions in a relevant category. Websites whose descriptions contain the term "telephone" are displayed to the user, as shown in FIG. 3.

As discussed above, because Yahoo! keyword searches only search the descriptions of websites and not their content, a Yahoo! keyword search can miss identifying websites that contain information relevant to the user's request. Thus, for example, many files at different websites in the Literature category may well contain the keyword "telephone." None of these would be detected and displayed to the user by Yahoo!, even though the user is interested in finding occurrences of "telephone" in websites that fall within the Literature category. In this way, the Yahoo!-type category/descriptive information search is overly narrow, and is prone to miss detecting information that the user would be interested in seeing.

Another known system for searching for information at websites stores and indexes a vast amount of content from numerous websites, but does not correlate website content with categories. Such a known system is the AltaVista", located at <http://www.altavista.digital.com>. In AltaVista", a user submits a keyword search. FIG. 4 shows the AltaVista" interface in which a user has submitted a keyword search request for the term "AT&T" 401. In response, AltaVista" searches its stored content for occurrences of the term "AT&T", and shows the user the websites that have content in which the term occurs (402.) Some excerpted content (e.g., 403) is also displayed. It is difficult for the user to efficiently and accurately identify websites that have content of interest to the user.

Just as the Yahoo!-type search can be too narrow, the AltaVista"-type content search can be too broad. For example, the results for the keyword search shown in FIG. 4 include over 300,000 websites 404. Even when the results are organized in some prioritized fashion (e.g., websites with the greatest number of occurrences of the keyword term are listed first), such a broad result is too large to be very useful to the user.

Searching by category and then using a keyword search to search the descriptive information about websites within a category can be too narrow, and miss detecting websites that have content that is relevant to the user's request. On the other hand, keyword searching of only the content of websites can be too broad. A way is needed to take advantage of the narrowing effect of a category search and the depth of a content search to yield a more accurate and complete search result.

SUMMARY OF THE INVENTION

In accordance with an embodiment of the present invention, websites are searched for desired information first by narrowing the scope of the search by identifying websites that correspond with a category pertinent to the desired information. Next, a keyword search is carried out on the content (not just the descriptions or summaries of content) of websites that fall within the pertinent category. This is advantageously more efficient than searching all of the content of the universe of websites initially, because such a search often disadvantageously returns too many results, many of which can be irrelevant (e.g., as in Altavista™) Likewise, it provides higher resolution than simply performing a category search, which can fail to identify websites within the category that have the most relevant information. It also provides higher resolution than narrowing the field of websites by category, and then performing a keyword search on website descriptions or content summaries, e.g., as in Yahoo!, which can miss relevant information that is included in the content itself, but not in the description or summary. The present invention advantageously combines the efficiency and accuracy of category and content searching to provide a more efficient, better way of finding the information most relevant to a user's need in a set of websites.

BRIEF DESCRIPTION OF THE DRAWINGS

FIG. 2 shows a keyword search request for websites that fall within a subcategory of the prior art search engine shown in FIG. 1.

FIG. 4 shows an interface and a keyword search request to a prior art embodiment of a content search engine.

DETAILED DESCRIPTION

The present invention provides a system and a method that advantageously combines the best aspects of category searching and content searching of websites in a way that enables a user to more accurately and completely identify websites with content of interest to the user, especially in a large collection of websites.

Figure 1:
FIG. 1 shows an interface to a prior art embodiment of a category/descriptive information search engine.
Figure 3:
FIG. 3 shows the results of the keyword search request submitted as shown in FIG. 2 in the prior art search engine shown in FIG. 1.
Figure 5:
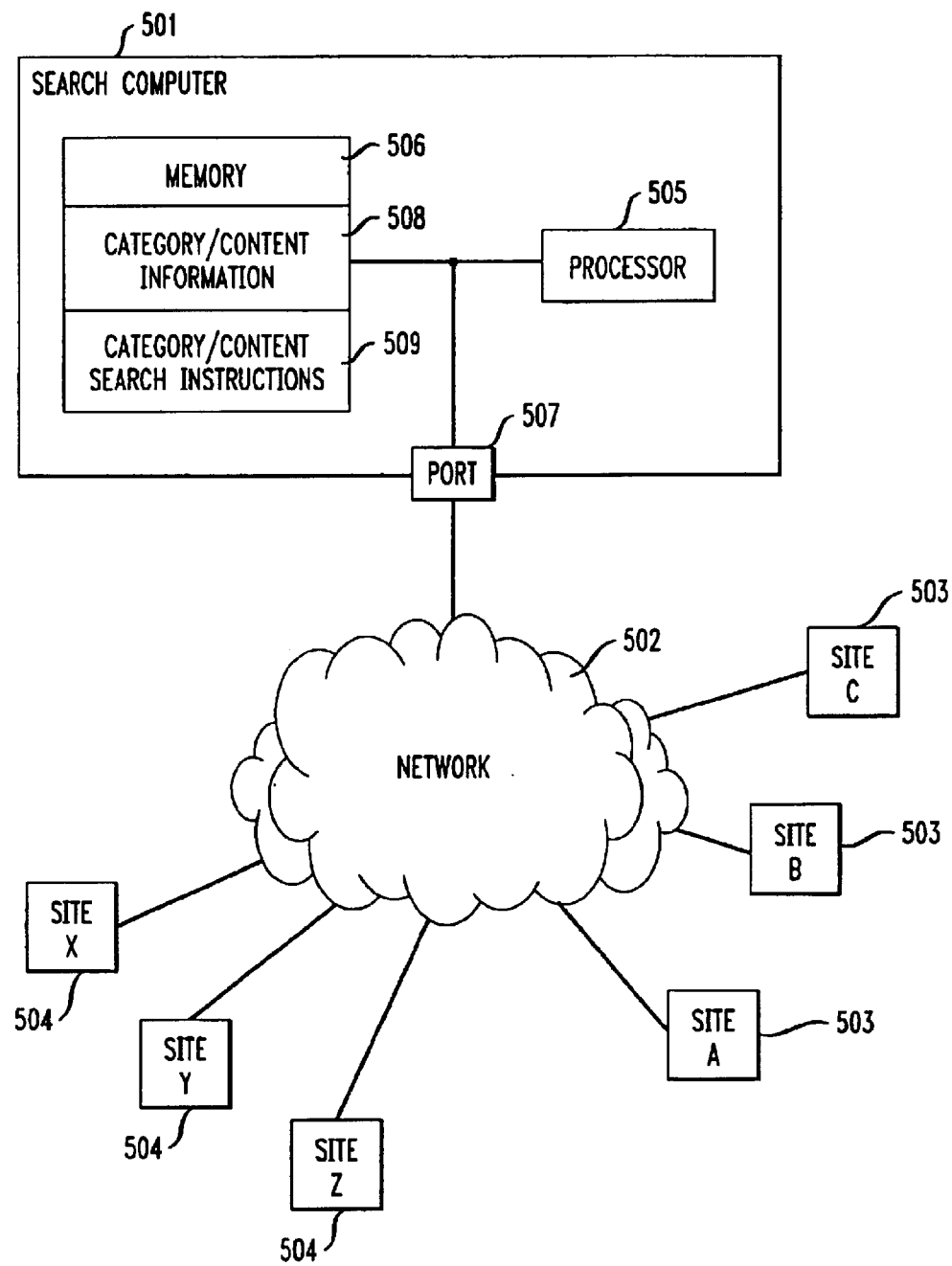
FIG. 5 shows a system in accordance with an embodiment of the present invention.

A system in accordance with an embodiment of the present invention is shown in FIG. 5. A search computer 501 is connected to a network 502 to which users 503 and sites 504 are also connected. The search computer 501 includes a processor 505, a memory 506 and a port 507. The memory 506 and the port 507 are coupled to the processor 505. The memory 506 stores website content correlated with categories 508. The memory 506 further stores category-content search instructions 509 adapted to be executed by the processor 505 to retrieve content from websites over a network and cause the retrieved content to be stored, to correlate a piece of content with a category, to receive a category selection from a user, to receive a keyword search from the user, and then to perform a content search on that stored website content which is correlated with the selected category. The term "correlated with the selected category" encompasses subcategories in embodiments having a hierarchical categorization scheme. The category-content instructions 509 are further adapted to be executed by the processor 505 to send the results of a search to the user.

In one embodiment of the present invention, website content is automatically gathered and stored using a software application called a spider, such as the Vspider, manufactured by Verity, Inc. of Sunnyvale, Calif. A spider is a computer program that automatically seeks out information (i.e., content) distributed on various nodes of a network (e.g., at websites on the Internet, or on an intranet) and sends it back to a predetermined location (e.g., the spider's home server) such as a search computer shown as 501 in FIG. 5. A spider such as Vspider can advantageously be used to collect the content to be searched in accordance with the present invention.

In one embodiment, the content that is retrieved by a spider is stored in a database. The database is coupled to a search computer, such as search computer 501 shown in FIG. 5. The content is searchable in the database using a known database search language, such as SQL.

In one embodiment, the Vspider is given the Uniform Resource Locator (URL) of a website. Vspider then searches the file corresponding to the URL, and identifies links from that file to other pages (the terms file and page are equivalent as used herein), which it proceeds to search. Upon searching a page, Vspider returns information such as the identity of the author of the page, the date on which the page was created, its size and some analysis of its textual content, possibly including at least a part of the textual content itself. An embodiment of the present invention advantageously uses the Verity spider in this fashion to automatically and efficiently gather website content, as well as information about the website.

In one embodiment, the processor 505 is a microprocessor, such as the Pentium II processor manufactured by the Intel Corporation of Santa Clara, Calif. In another embodiment, the processor 505 is an Application Specific Integrated Circuit (ASIC) which at least partly embodies the category-content instructions 509, the rest of which (if any) are stored in the memory 506.

Embodiments of memory 506 include read-only memory (ROM), random access memory (RAM), a hard disk, a compact disc, a database, or any other device adapted to store information in digital form, or any combination thereof.

The term "adapted to be executed by the processor" is meant to encompass instructions that are compressed, encrypted, uncompiled, or must otherwise be processed in order to be executed by the processor 505. Machine language or any other format of instruction that can be executed by the processor 505 without further manipulation are also meant to be encompassed by this term.

Figure 6:
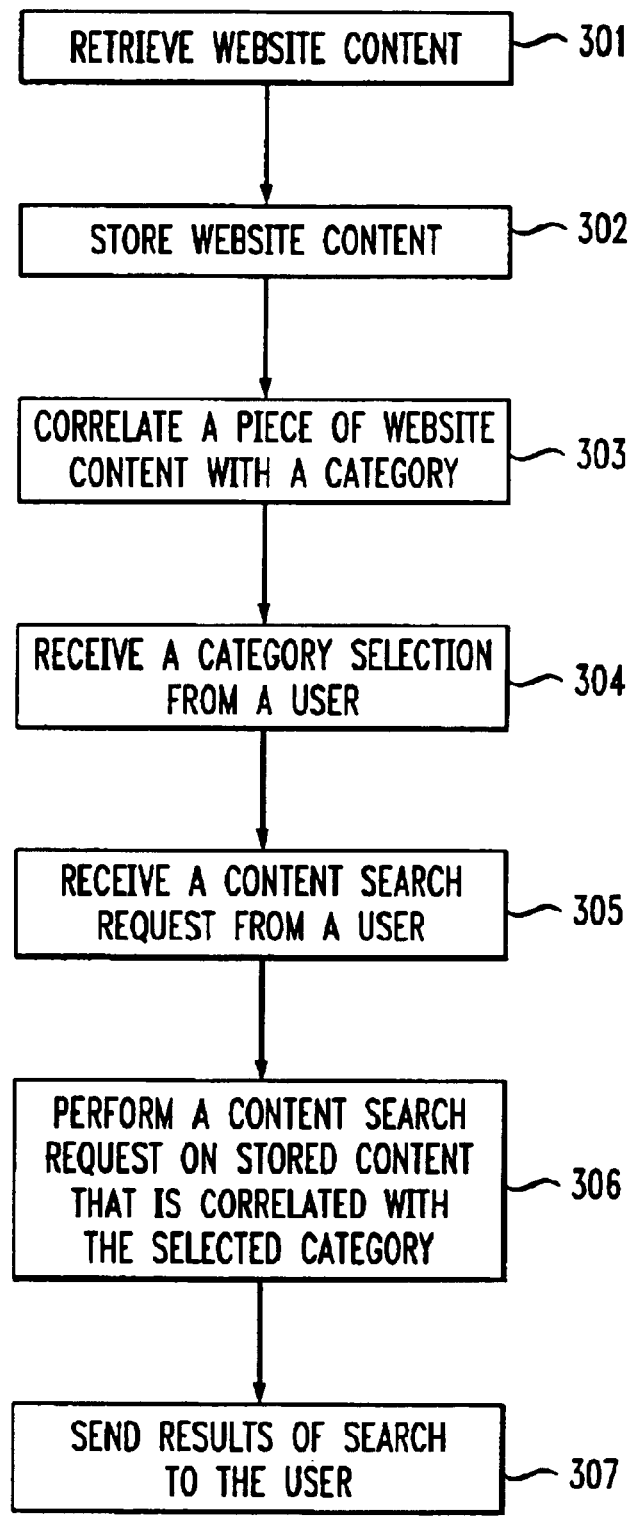
FIG. 6 is a flow chart illustrating an embodiment of the method in accordance with an embodiment of the present invention.

A method in accordance with an embodiment of the present invention is now described with reference to the flow chart shown in FIG. 6. Website content is retrieved through a network (step 301), and is stored (step 302.) A piece of stored website content is correlated with a category (step 303.) A category selection is received from a user (step 304.) A content search request (e.g., a keyword search request) for websites in the selected category is received from the user (step 305.) A content search on the stored website content that is correlated with the selected category is then performed (step 306.) The results of this category-content search are sent to the user (step 307.)

Figure 7:
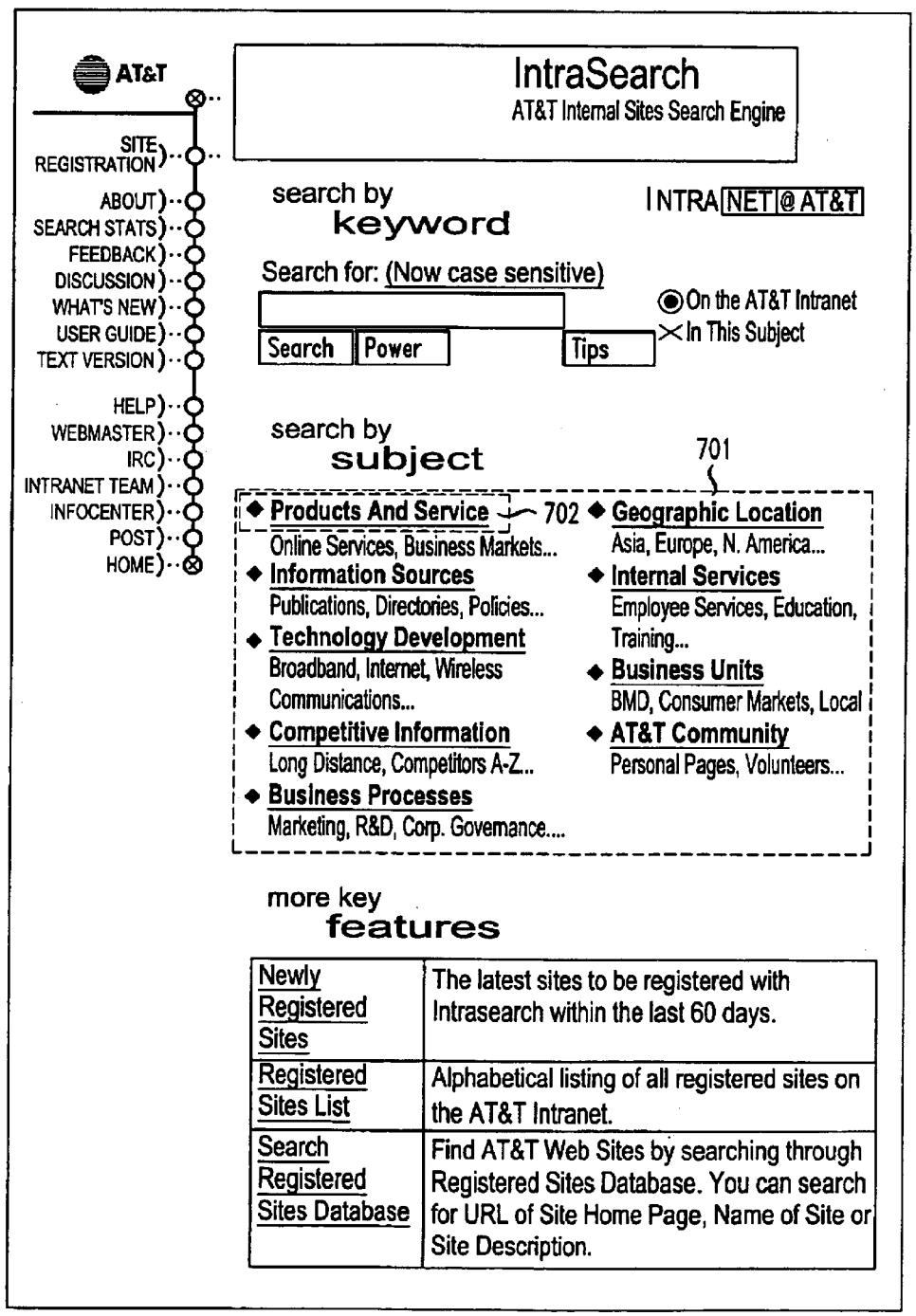
FIG. 7 shows an interface in accordance with an embodiment of the present invention.
Figure 8:
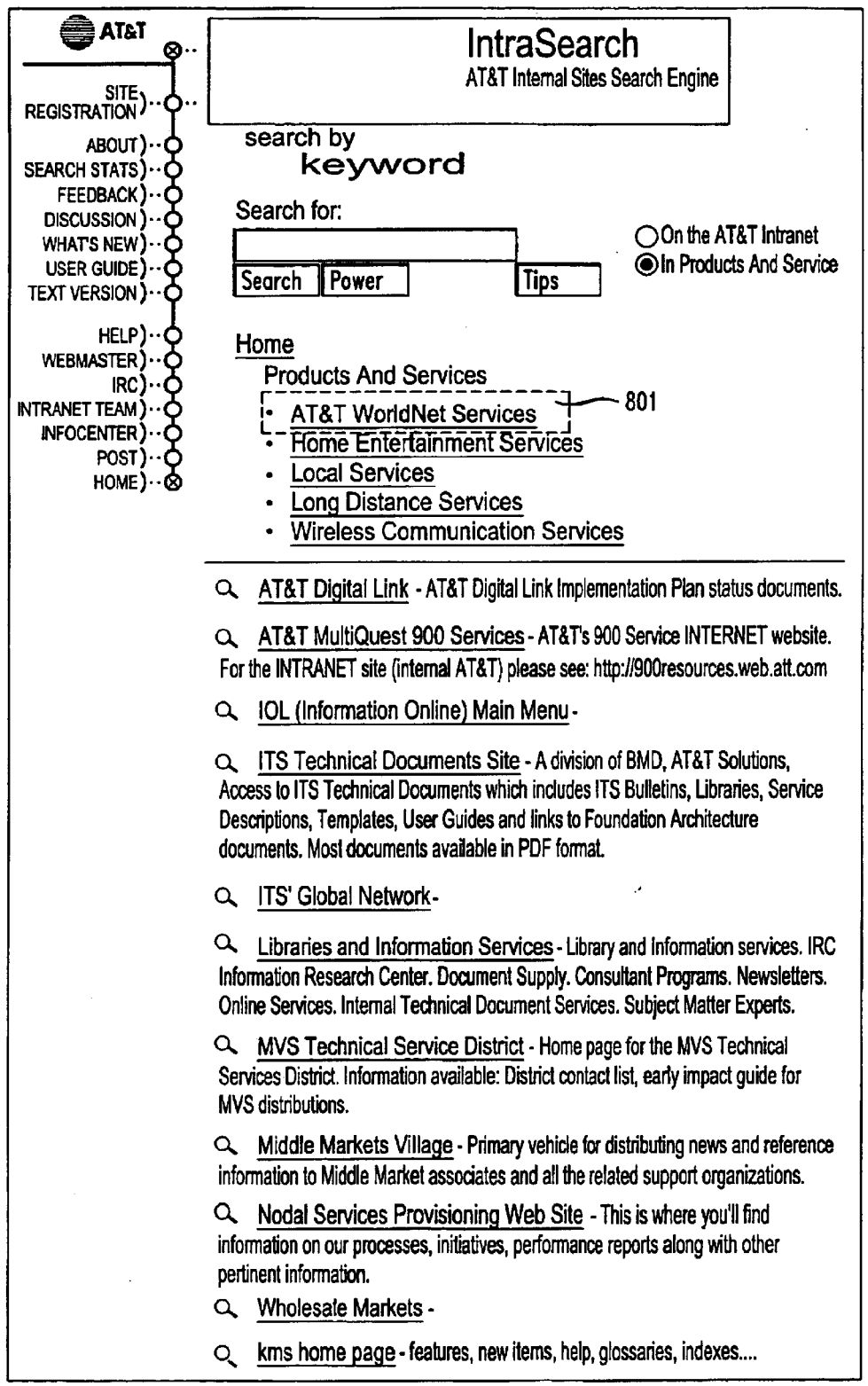
FIG. 8 shows an interface that displays categories for user selection in accordance with an embodiment of the present invention.
Figure 9:
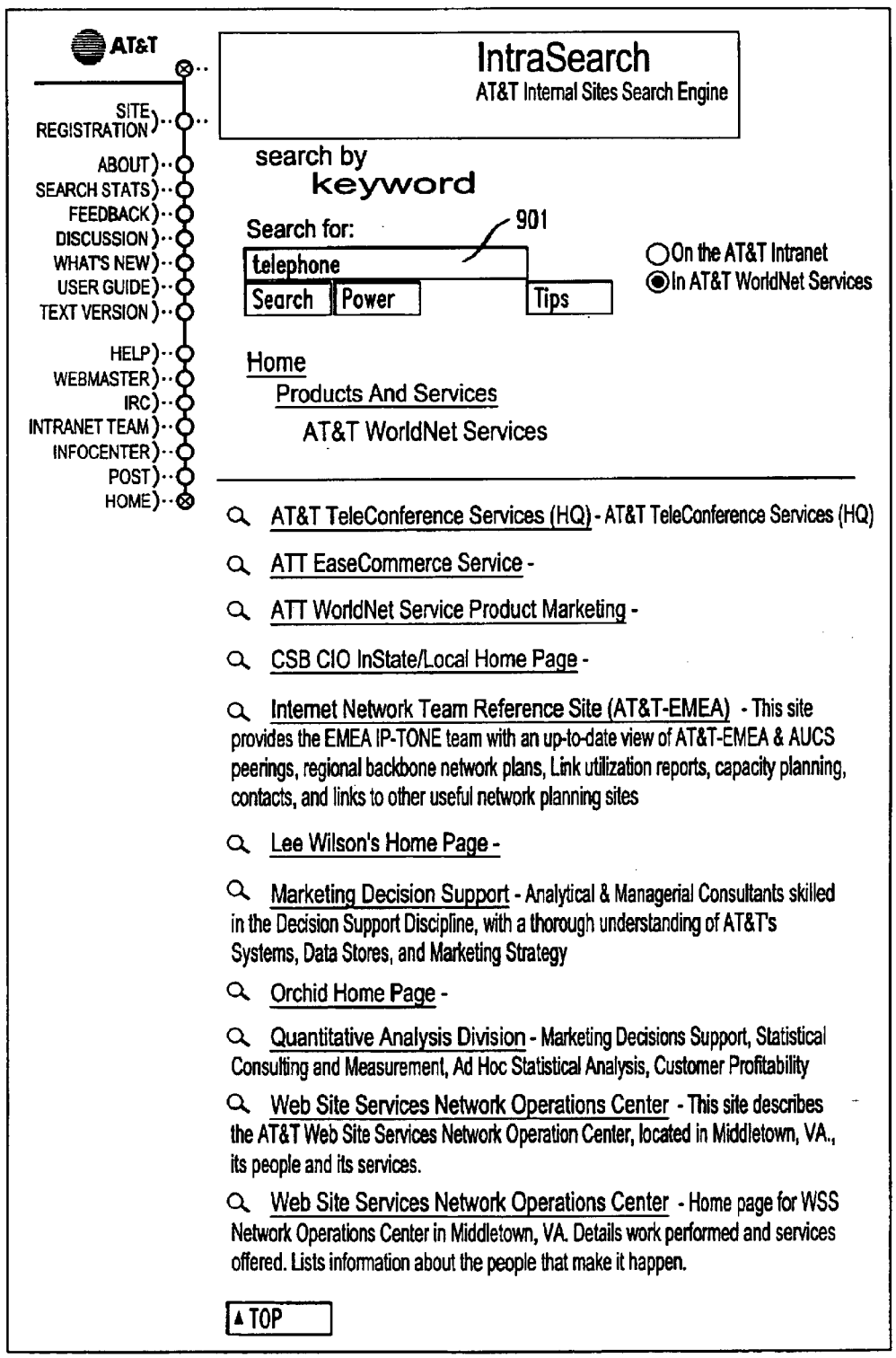
FIG. 9 shows an interface that displays subcategories of the categories shown in the interface depicted in FIG. 8 for user selection in accordance with an embodiment of the present invention.
Figure 10:
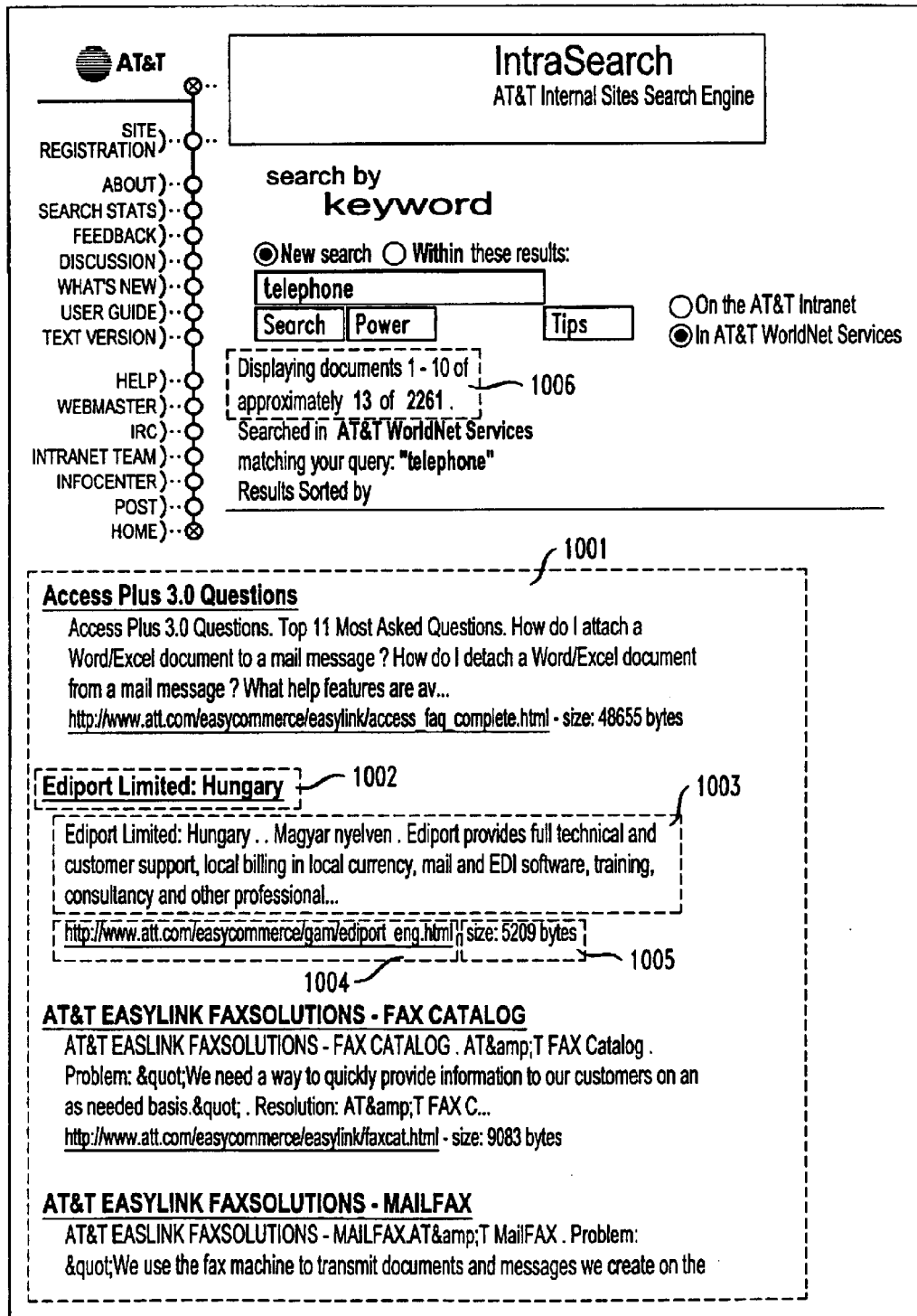
FIG. 10 shows the results of a content search after category selection in accordance with an embodiment of the present invention.

FIG. 7 shows an interface for an embodiment of the present invention through which a user selects a category. Categories 701 are listed under the heading "Search by Subject." For example, a user selects the "Products and Services" category 702, which causes the interface shown in FIG. 8 to be displayed. The user then selects the subcategory "AT&T WorldNet" Services" 801 (shown in FIG. 8), which causes the interface shown in FIG. 9 to be displayed. As shown in FIG. 9, the user then submits a search for the keyword "telephone" 901. A content search for files in which the term "telephone" occurs is performed on content (e.g., files) stored from websites that fall into the category "AT&T WorldNet" Services. The results of the search are displayed to the user in one embodiment as a dynamically generated web page, such as the one shown in FIG. 10. The term "dynamically generated web page" means a web page that includes content specifically tailored to respond to the user query.

In one embodiment of the present invention, a dynamic index is stored that includes a list of identifiers (e.g., URLs) for websites that are associated with a selected category. The dynamic index is used to track the identities of all websites that correspond to a selected category or categories. For example, in a hierarchical category system wherein a category includes certain other categories (e.g., the literature category includes the classics and modern romance categories), a dynamic index includes identifiers for all websites in the selected category and its subcategories. When a user further narrows a category selection, the identifiers of newly excluded websites are dropped from the dynamic index. Likewise, when a user broadens a category selection, the identifiers of newly included websites are added to the dynamic index.

A content search in one embodiment searches all of the content of all of the pages that comprise a website that falls within the selected category or categories. In another embodiment, the content search is performed by searching a subset of the content stored at the website in the selected category. For example, the content search can be restricted to the contents of metatags in the pages of the website. A metatag is defined herein as a subset of content marked-off from other content in a page. For example, the following line of text is embedded in a page at a website:

This is the content that will not be searched <METATAG> and this is the content that will be searched.</METATAG> That is, the content between <METATAG> and </METATAG> will be searched, while the rest will not be searched.

Files that contains the term "telephone" are shown (1001) ranked in order where a file with more occurrences of the keyword is shown before a file with fewer occurrences. The name of the file (or site) 1002 is displayed, along with an excerpt of content (1003) from the file or site. A hyperlink (1004) to the site or file is also provided, as well as an indication of the file's size (1005.) The number of the results (1006) returned for a search in accordance with the present invention is typically substantially smaller (and therefore more manageable) than the number of results returned for an identical search request submitted to AltaVista". Also, the present invention advantageously provides more comprehensive and accurate results than a comparable Yahoo! search in many cases. The advantageous combination of category and content searching provided in accordance with the present invention produces website search results that are more accurate and comprehensive than the results provided by known systems.

Although several embodiments are specifically illustrated and described herein, it will be appreciated that modifications and variations of the present invention are covered by the above teachings and within the purview of the appended claims without departing from the spirit and intended scope of the invention.

What is claimed is:

1. A method comprising:
   correlating a plurality of websites with a plurality of categories and sub-categories;
   providing, for a user, the plurality of categories correlated with the plurality of websites;
   receiving at least one category selection;
   providing sub-categories associated with the at least one category selection;
   receiving at least one sub-category selection;
   receiving a user-selected search string; and
   performing a content based search using the search string on the websites associated with the sub-category selected.

2. A method comprising:
   correlating a plurality of websites with a plurality of categories and sub-categories;
   providing, for a user, the plurality of categories correlated with the plurality of websites;
   receiving at least one category selection;
   providing sub-categories associated with the at least one category selection;
   receiving at least one sub-category selection;
   receiving a user-selected search string;
   performing a dynamic content based search using the search string on the websites associated with the sub-category selected; and
   providing a selection of search results from the dynamic content based search.

3. A method comprising:
   performing a pre-emptive categorical based classification of a plurality of websites;
   receiving search criteria from a user;
   performing a content based search of information comprised in the categorical based classified websites based on the search criteria received from the user; and
   providing websites that fulfill the user's search criteria.

4. The method of claim 3, wherein performing a pre-emptive categorical based classification of a plurality of websites comprises narrowing the scope of a user search by identifying websites that correspond with a category pertinent to information being searched.

5. The method of claim 3, wherein performing a content based search of information comprised in the categorical based classified websites based on the search criteria received from the user comprises performing a content search on the websites.

6. The method of claim 5, wherein the content search is performed on metatags of the websites that fall within a pertinent category.

7. The method of claim 3, further comprising storing a dynamic index that includes a list of identifiers for websites that are associated with a selected category.

8. The method of claim 7, wherein the dynamic index is used to track the identities of all websites that correspond to a selected category.

9. The method of claim 8, wherein when a user narrows a category selection, the identifiers of newly excluded websites are dropped from the dynamic index.

10. The method of claim 8, wherein when a user broadens a category selection, the identifiers of newly included websites are added to the dynamic index.

11. The method of claim 3, wherein the steps of performing a pre-emptive categorical based classification of a plurality of websites, receiving search criteria from a user, performing a search of the categorical based classified websites based on the search criteria received from the user and providing websites that fulfill the user's search criteria are executed within a browser based user interface.

12. The method of claim 3, wherein providing websites that fulfill the user's search criteria is provided via a dynamically generated web page which includes content specifically tailored to respond to the user.

13. The method of claim 3, further comprising prompting the user for the search criteria.

14. The method of claim 3, wherein providing websites that fulfill the user's search criteria comprises dynamically generating a web page containing links responsive to the user's search.

15. A method comprising:

correlating a plurality of websites with a plurality of categories;

providing, for a user, the plurality of categories correlated with the plurality of websites;

receiving, at least one user-selected category;

receiving, a user-provided search string; and performing a content based search using the user-provided search string on the websites associated with the user-selected category.

16. The method of claim 15, wherein the information comprised in the categorical based classified websites is stored separately from the categorical based classified websites.

17. The method of claim 15, further comprising: retrieving website content.

18. The method of claim 15, further comprising: storing website content.

19. The method of claim 15, further comprising: prompting the user to select at least one category selection.

20. The method of claim 15, further comprising: prompting the user to provide the search string.

* * * * *